US012684014B2

(12) United States Patent
Boin et al.

(10) Patent No.: US 12,684,014 B2
(45) Date of Patent: Jul. 14, 2026

(54) METHODS AND SYSTEMS FOR DETECTING DENIAL OF SERVICE ATTACKS ON A NETWORK

(71) Applicant: OVH, Roubaix (FR)

(72) Inventors: Clement Boin, Lille (FR); Tristan Groleat, Brest (FR); Xavier Guillaume, Roubaix (FR); Gilles Grimaud, Lille (FR); Michael Hauspie, Seclin (FR)

(73) Assignee: OVH, Roubaix (FR)

( * ) Notice: Subject to any disclaimer, the term of this patent is extended or adjusted under 35 U.S.C. 154(b) by 182 days.

(21) Appl. No.: 18/609,151

(22) Filed: Mar. 19, 2024

(65) Prior Publication Data

US 2024/0323224 A1       Sep. 26, 2024

(30) Foreign Application Priority Data

Mar. 21, 2023    (EP) ..................................... 23305381

(51) Int. Cl.
*H04L 9/40*              (2022.01)
(52) U.S. Cl.
CPC ................................ *H04L 63/1458* (2013.01)
(58) Field of Classification Search
CPC ............. H04L 63/1458; H04L 63/1416; H04L 2463/141; H04L 2463/142; H04L 63/1425
See application file for complete search history.

(56) References Cited

U.S. PATENT DOCUMENTS

| | | | | |
|---|---|---|---|---|
| 12,132,758 | B1 * | 10/2024 | Kalani | ................ H04L 67/1014 |
| 2007/0283436 | A1 | 12/2007 | Duffield et al. | |
| 2012/0216282 | A1 | 8/2012 | Pappu et al. | |
| 2023/0412631 | A1 * | 12/2023 | Revankar | ............ H04L 63/1425 |

FOREIGN PATENT DOCUMENTS

| | | |
|---|---|---|
| CN | 111614627 A | 9/2020 |
| EP | 3618355 A1 | 3/2020 |

OTHER PUBLICATIONS

European Search Report with regard to the EP Patent Application No. EP 23305381.8 completed Aug. 18, 2023.

(Continued)

*Primary Examiner* — Ryan J Jakovac
(74) *Attorney, Agent, or Firm* — BCF LLP

(57)                ABSTRACT

Methods and systems for detecting Denial-of-Service (DoS) attacks on a network. The method includes clustering connection requests received at the network during a first collection time having a first time span based on communication datasets extracted therefrom. For at least one connection cluster, a first DoS attack detection algorithm is executed to determine a first probability that the connection cluster is associated with a DoS attack. The first confidence score is compared with a first threshold to determine whether a mitigation order is to be generated. The connection cluster is adjusted by extracting second communication datasets from connection requests received at the network during a second collection time having a second time span longer than the first time span, and a second DoS attack detection algorithm is executed to determine a second probability that the connection cluster is associated with a DoS attack.

14 Claims, 7 Drawing Sheets

(56)                    References Cited

OTHER PUBLICATIONS

Chen, "A New Detection Method for Distributed Denial-of-Service Attack Traffic based on Statistical Test", The Journal of Universal Computer Science, Jan. 2009, 15(2), pp. 488-504, https://lib.jucs.org/article/29318/.

Hoque et al., "Real-time DDoS attack detection using FPGA", Computer Communications, Sep. 2017, vol. 110, pp. 48-58, https://www.sciencedirect.com/science/article/abs/pii/S0140366416306442?via%3Dihub.

Peng et al., "Detecting Distributed Denial of Service Attacks by Sharing Distributed Beliefs", Australasian Conference on Information Security and Privacy, Jan. 2003, pp. 214-225, https://link.springer.com/chapter/10.1007/3-540-45067-X_19.

Gera et al., "Detection of spoofed and non-spoofed DoS attacks and discriminating them from flash crowds", EURASIP Journal on Information Security, Jul. 2018, https://ieeexplore.ieee.org/document/5199191, pp. 1-12.

Oikonomou et al., "Modeling Human Behavior for Defense Against Flash-Crowd Attacks", IEEE International Conference on Communications, Jun. 2009, https://ieeexplore.ieee.org/document/5199191, 6 pages.

Gavrilis et al., "Flash Crowd Detection Using Decoy Hyperlinks", IEEE International Conference on Networking, Sensing and Control, Apr. 2007, pp. 466-470, https://ieeexplore.ieee.org/document/4239036.

Koay et al., "A new multi classifier system using entropy-based features in DDoS attack detection", International Conference on Information Networking (ICOIN), 2018, pp. 162-167, https://ieeexplore.ieee.org/document/8343104.

David et al., "DDoS Attack Detection Using Fast Entropy Approach on Flow- Based Network Traffic", Procedia Computer Science, May 2015, vol. 50, pp. 30-36, https://www.sciencedirect.com/science/article/pii/S1877050915005086?via%3Dihub.

Bhuyan et al., "An empirical evaluation of information metrics for low-rate and high-rate DDoS attack detection", Pattern Recognition Letters, Jan. 2015, vol. 51, pp. 1-7, https://www.sciencedirect.com/science/article/abs/pii/S016786551400244X?via%3Dihub.

Lysenko et al., "Detection of the botnets' low-rate DDoS attacks based on self-similarity", International Journal of Electrical and Computer Engineering (IJECE), vol. 10, No. 4, 2020, pp. 3651-3659.

Ma et al., "DDoS Detection Method Based on Chaos Analysis of Network Traffic Entropy", IEEE Communications Letters, Jan. 2014, vol. 18, No. 1, pp. 114-117, https://ieeexplore.ieee.org/document/6679197.

Wang et al., "Detecting SYN flooding attacks", Proceedings. Twenty-First Annual Joint Conference of the IEEE Computer and Communications Societies, 2002, pp. 1530-1539, https://ieeexplore.ieee.org/document/1019404.

Chen et al., "Collaborative Change Detection of DDOS Attacks on Community and ISP Networks", International Symposium on Collaborative Technologies and Systems (CTS'06), 2006, pp. 401-410, https://ieeexplore.ieee.org/document/1644164.

Francois et al., "FireCol: A Collaborative Protection Network for the Detection of Flooding DDoS Attacks," IEEE/ACM Transactions on Networking, vol. 20, No. 6, Dec. 2012, pp. 1828-1841, https://ieeexplore.ieee.org/document/6189766.

Fortunati et al., "An improvement of the state-of-the-art covariance-based methods for statistical anomaly detection algorithms", SIViP 10, 2016, pp. 687-694, https://link.springer.com/article/10.1007/s11760-015-0796-y.

Tao et al., "DDoS Attack Detection at Local Area Networks Using Information Theoretical Metrics," 12th IEEE International Conference on Trust, Security and Privacy in Computing and Communications, 2013, pp. 233-240, https://ieeexplore.ieee.org/document/6680846.

Hoque et al., "A novel measure for low-rate and high-rate DDoS attack detection using multivariate data analysis", COMSNETS 2016—Poster Track, pp. 1-2.

Hoque et al., "FFSc: a novel measure for low-rate and high-rate DDoS attack detection using multivariate data analysis", Security Comm. Networks, 9: pp. 2032-2041, https://onlinelibrary.wiley.com/doi/epdf/10.1002/sec.1460.

Ozcelik et al., "Cusum—entropy: an efficient method for DDoS attack detection", 4th International Istanbul Smart Grid Congress and Fair (ICSG), 2016, pp. 1-5, https://ieeexplore.ieee.org/document/7492429.

Nagy et al., "Detecting DDoS attacks within milliseconds by using FPGA-based hardware acceleration", NOMS 2018—2018 IEEE/IFIP Network Operations and Management Symposium, 2018, pp. 1-4, https://ieeexplore.ieee.org/document/8406299.

Mathew et al., "Survey of Low Rate DOS Attack Detection Mechanisms", ICWET 2011-TCET, India, pp. 955-958.

* cited by examiner

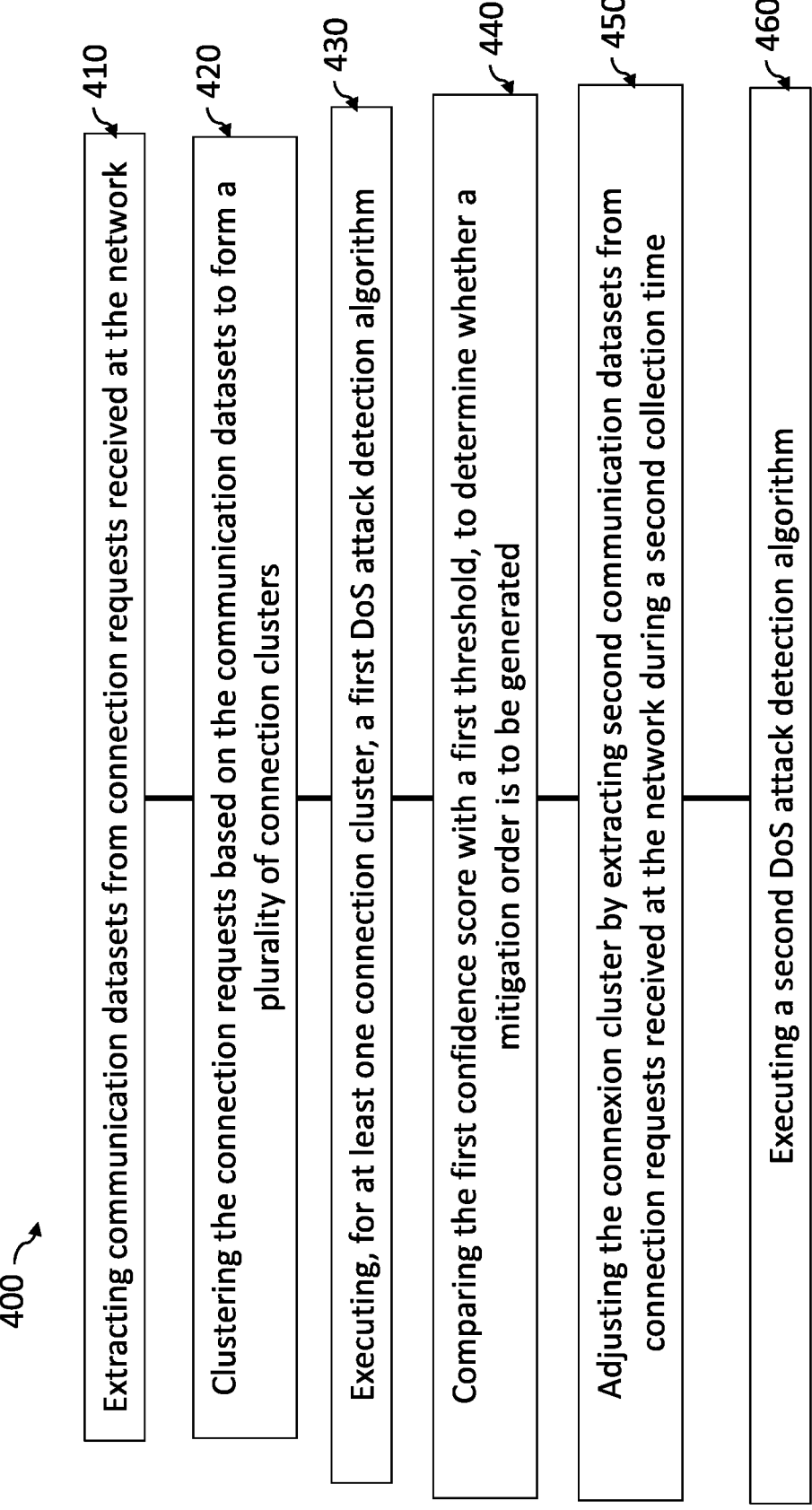

400

410 Extracting communication datasets from connection requests received at the network 420 Clustering the connection requests based on the communication datasets to form a plurality of connection clusters 430 Executing, for at least one connection cluster, a first DoS attack detection algorithm 440 Comparing the first confidence score with a first threshold, to determine whether a mitigation order is to be generated 450 Adjusting the connexion cluster by extracting second communication datasets from connection requests received at the network during a second collection time 460 Executing a second DoS attack detection algorithm

Figure 5

METHODS AND SYSTEMS FOR DETECTING DENIAL OF SERVICE ATTACKS ON A NETWORK

CROSS REFERENCE

The present application claims priority to EP Application number EP 23305381.8, filed Mar. 21, 2023, entitled "METHODS AND SYSTEMS FOR DETECTING DENIAL OF SERVICE ATTACKS ON A NETWORK", the entirety of which is incorporated herein by reference.

FIELD

The present technology relates to the field of Internet security. In particular, the systems and methods for detecting Denial of Service (DoS) attacks and Distributed Denial of Service (DDoS) attacks on a network.

BACKGROUND

Due to the growing coverage of cloud computing, more and more Internet services rely on cloud providers to ensure the availability of their services. Malicious attempts to disrupt the normal traffic of a targeted server, service or network are one of the main threats against service availability. Denial of Service (DoS) attacks and Distributed Denial of Service (DDoS) attacks are ones of the most widespread attacks.

A botnet including a large number of bots can be used to cause a denial of service (DoS) attack on a service provider, for example a server. A DoS attack causes the service provider to be flooded with superfluous requests. When under such an attack, the service provider processing and communicating capabilities may become so overloaded that it is temporarily unable to provide service to legitimate users and clients. Because the attack is delivered through a large number of sources, i.e. a large number of bots, having thousands of distinct Internet Protocol (IP) addresses, blocking the attack cannot be achieved by blocking a single source. Given that a DoS attack may involve such large numbers of IP addresses, some of which being assigned to devices that were legitimate before being infected, a simple blacklisting of potentially harmful IP addresses is not an efficient solution. IP addresses are frequently dynamically assigned, so blacklisting may lead to eventually blocking legitimate devices.

These attacks may be volumetric (high data rates) or targeted on specific application vulnerabilities (low data rates). A high-rate traffic attack may be hard to differentiate from flash-crowd events as the differences in characteristics between the two may be small and require a knowledge of a nominal traffic at the service provider. On the other hand, low-rate attacks can be hard to differentiate from legitimate traffic because attacks of this type tend to mimic legitimate traffic to get past the detection systems. Moreover, the relatively high computational resource of these algorithms usually makes them unsuitable for standard mitigation operations. Indeed, time is often critical when it comes to malicious connection attempts. Conventional mitigation solutions are slow to react. Although some solutions have been shown to react within 30 seconds, this delay may actually exceed the duration of a DDoS attack, in which cases the mitigation is essentially fruitless.

Therefore, a system for authenticating a target network at an access network for mitigation of malicious connection attempts with a low-latency decision process is desirable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Implementations of the present technology have been developed based on developers' appreciation of shortcomings associated with the prior art. In particular, such shortcomings may comprise the delays of current mitigation solutions that may actually exceed the duration of a DoS attack.

In a first broad aspect, various implementations of the present technology provide a computer-implemented method for detecting a Denial-of-Service (DoS) attack on a network. The method includes extracting first communication datasets from connection requests received at the network during a first collection time having a first time span, each first communication dataset comprising a connection request and an indication of a corresponding destination device and clustering the connection requests based on the communication datasets to form a plurality of connection clusters. For at least one of the connection clusters, the method includes executing a first DoS attack detection algorithm, to generate, based on the communication datasets corresponding to the given connection cluster, a first confidence score indicative of a first probability that the connection cluster is associated with a DoS attack, comparing the first confidence score with a first threshold, to determine whether a mitigation order is to be generated, adjusting the connection cluster by extracting second communication datasets from connection requests received at the network during a second collection time having a second time span longer than the first time span and executing a second DoS attack detection algorithm to generate, based on the communication datasets corresponding to the given connection cluster, a second confidence score indicative of a second probability that the connection cluster is associated with a DoS attack.

In some non-limiting implementations, the communication dataset of a given connection request further includes information about a source IP address of a corresponding device and information about a destination IP address of a corresponding destination device. The first DoS attack detection algorithm is a DoS attack coarse detection algorithm configured to aggregate connection requests per IP address to form the connexion clusters.

In some non-limiting implementations, the second DoS attack detection algorithm is a DoS attack fine detection algorithm configured to aggregate connection requests per pair of source IP address/destination IP address to adjust the connexion clusters.

In some non-limiting implementations, comparing the first confidence score with a first threshold, to determine whether a mitigation order is to be generated includes comparing the first confidence score with a first threshold, to determine whether (i) a mitigation order is to be generated or (ii) a flash-crowd detection algorithm is to be executed, the flash-crowd detection algorithm being configured to establish whether the connection cluster is associated with a flash-crowd event.

In some non-limiting implementations, the method further includes comparing the second confidence score with a second threshold to determine whether (i) a mitigation order is to be generated or (ii) a third DoS attack detection algorithm is to be executed, the third DoS attack detection algorithm being configured to generate, based on the communication datasets corresponding to the given connection cluster, a third confidence score indicative of a third probability that the connection cluster is associated with a DoS attack.

In some non-limiting implementations, the method further includes, in response the third DoS attack detection algorithm being executed and to no DoS attack being detected by the third DoS attack detection algorithm, executing a fourth DoS attack detection algorithm to generate, based on the communication datasets corresponding to the given connection cluster, a fourth confidence score indicative of a fourth probability that the connection cluster is associated with a DoS attack.

In some non-limiting implementations, the execution of the first DoS attack detection algorithm is constrained, for the given connection cluster, within a first processing resource allocation, and the execution of the second DoS attack detection algorithm is constrained, for the given connection cluster, within a second processing resource allocation being greater than the first processing resource allocation.

In some non-limiting implementations, the execution of the third DoS attack detection algorithm is constrained, for the given connection cluster, within a third processing resource allocation and the execution of the fourth DoS attack detection algorithm is constrained, for the given connection cluster, within a fourth processing resource allocation being greater than the third processing resource allocation.

In some non-limiting implementations, the third DoS attack detection algorithm is configured to generate the third confidence score based on third communication datasets corresponding to the given connection cluster extracted during a third collection time having a third time span. The method further includes, prior to executing the fourth DoS attack detection algorithm, adjusting the connection cluster by extracting fourth communication datasets from connection requests received at the network during a fourth collection time having a fourth time span longer than the third time span.

In some non-limiting implementations, the method further includes comparing the fourth confidence score with a third threshold to determine whether (i) a mitigation order is to be generated or (ii) a network access granting order to the network is to be generated.

In some non-limiting implementations, at least one of the first, second, third and fourth DoS detection algorithm includes at least one of a neural network-based algorithm, a decision tree-based algorithm and a support vector machine-based algorithm.

In some non-limiting implementations, the method further includes comparing the third confidence score with a fourth threshold to determine whether a network access granting order to the network is to be generated.

In some non-limiting implementations, the method further includes, comparing the first confidence score with a fifth threshold to determine whether the third DoS attack detection algorithm is to be executed subsequently to the execution of the first DoS attack detection algorithm.

In some non-limiting implementations, the method further includes, in response to a flash-crowd event being detected by the flash-crowd detection algorithm, executing the third DoS attack detection algorithm.

In some non-limiting implementations, the communication dataset of a given connection request further includes information about a source IP address of a corresponding device, information about a source port of the corresponding device, information about a destination IP address of a corresponding destination device, information about a destination port of the corresponding destination device and information about a protocol used for communication between the corresponding device and the corresponding destination device.

In some non-limiting implementations, a data format of a given connection request is selected from a group of data formats including NetFlow data format, SFlow data format and kFlow data format.

In some non-limiting implementations, an execution of the mitigation order causes activation of an anti-DoS attack dedicated system configured to execute mitigation measures.

In some non-limiting implementations, clustering the connection requests includes identifying a corresponding destination device for each of the connection request and partitioning the connection requests into connection clusters based on their corresponding destination device, the connection requests of a same connection cluster being associated to a same destination device.

In some non-limiting implementations, the first DoS attack detection algorithm is a high-rate DoS coarse detection algorithm, the second DoS attack detection algorithm is a high-rate DoS fine detection algorithm, the third DoS attack detection algorithm is a low-rate DoS coarse detection algorithm, and/or the fourth DoS attack detection algorithm is a low-rate DoS fine detection algorithm.

In some non-limiting implementations, the DoS attack is a Distributed-Denial-of-Service (DDoS) attack.

In a second broad aspect, various implementations of the present technology provide a system for detecting Denial-of-Service (DoS) attacks on a network, the system including a controller and a memory storing a plurality of executable instructions which, when executed by the controller, cause the system to perform the method.

In a third broad aspect, various implementations of the present technology provide a non-transitory computer-readable medium comprising computer-readable instructions that, upon being executed by a system, cause the system to perform method.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 5 is a sequence diagram showing operations of a method for detecting malicious connection attempts from at least one device at an access network for accessing an infrastructure in accordance with some non-limiting implementations of the present technology.

Figure 1:
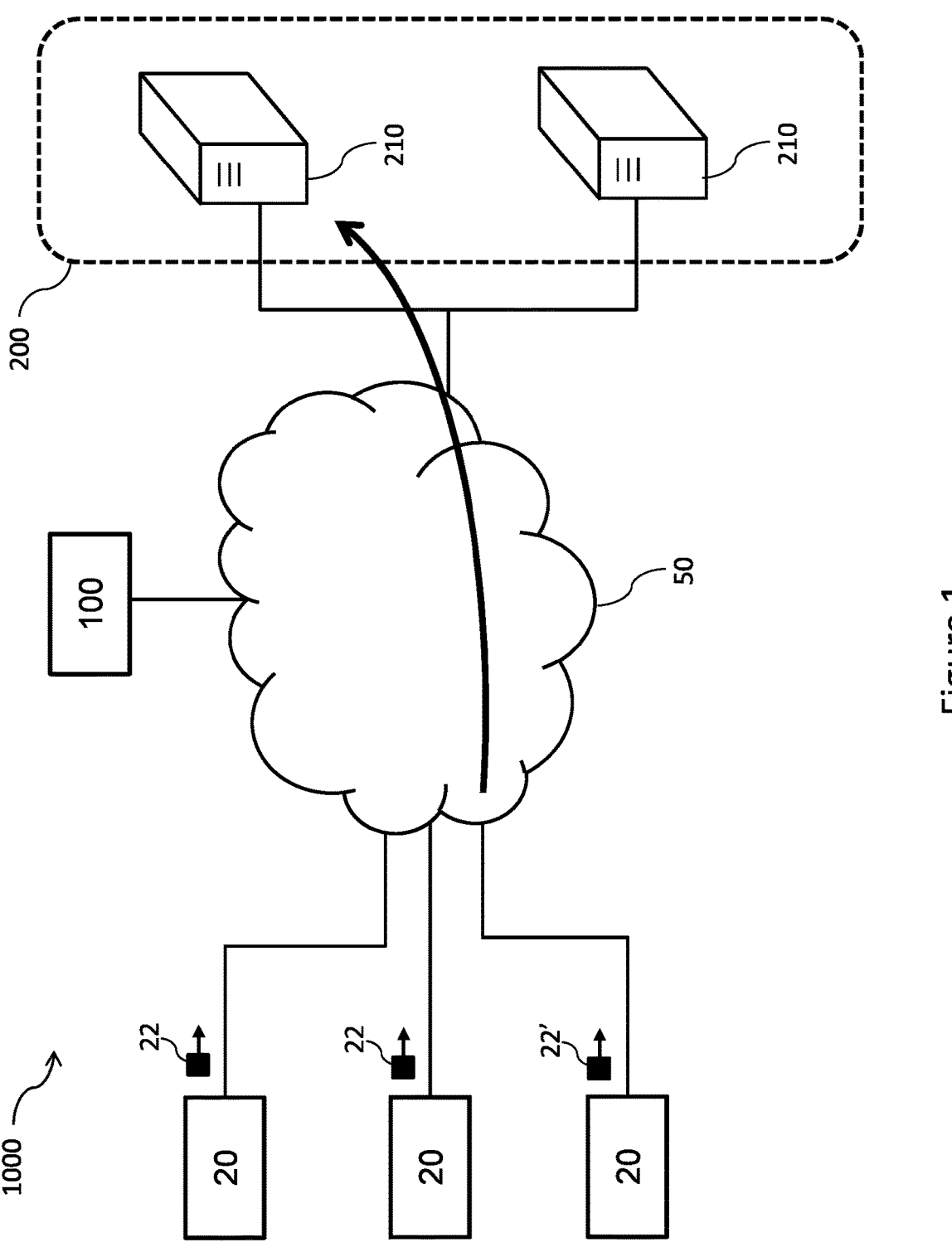
FIG. 1 is a schematic representation of a communication environment in accordance with some non-limiting implementations of the present technology.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some implementations of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

In the context of the present specification, unless expressly provided otherwise, a computer system may refer, but is not limited to, an "electronic device", an "operation system", a "system", a "computer-based system", a "controller unit", a "monitoring device", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

In the context of the present disclosure, a Denial-of-Service (DoS) refers to a malicious attack on a data processing component and may be a Distributed Denial-of-Service (DDoS) attack. In other words, A DDoS attack is a DoS attack in which numerous computers or machines flood a targeted resource.

In the context of the present disclosure, a collecting time of a system with respect to a traffic of data is a period of time during which the system collects information about the traffic of data. The collecting time may be associated with a corresponding time span. For example and without limitations, the system may collect, during the collecting time, data packets of the traffic of data and/or metadata associated therewith.

With these fundamentals in place, we will now consider some non-limiting examples of the present technology.

FIG. 1 is a schematic representation of a communication environment 1000 in which a plurality of devices 20 are communicably connected to an infrastructure 200 over a communication network 50 via any wired or wireless communication link including, for example, 4G, LTE, Wi-Fi, or any other suitable connection. The communication network 50 may be referred to as an "access network" of the infrastructure 200.

The infrastructure 200 may for example represent a data center, or a plurality of data centers, providing hosting services for one or more customers. As such, the infrastructure 200 may be referred to as a "service provider". It will be appreciated that the infrastructure 200 may include a large number of servers for hosting services for a large number of customers and that the infrastructure 200 may be distributed over a plurality of datacenters (not shown) for redundancy, reliability and/or load sharing purposes. The datacenters forming the infrastructure 200 may be geographically distributed, for example worldwide. The illustrated infrastructure 200 of FIG. 1 is heavily simplified for ease of illustration.

In an implementation, all components of the infrastructure 200 may be co-located in a same installation, for example being part of a same datacenter. In another implementation, some of the components of the infrastructure 200 may be distant from other components of the infrastructure 200, geographically separated components of the infrastructure communicating via the Internet or via a private network. In an illustrative but non-limiting example, servers providing services to customers of the infrastructure may be installed in large numbers in many locations while, in the same example, components of the system for defending against DoS attacks may be installed in a limited number of locations.

In some non-limiting implementations of the present technology, the communication network 50 may be implemented as the Internet. In other implementations of the present technology, the communication network 50 can be implemented differently, such as any wide-area communication network, local-area communication network, a private communication network and the like. How the communication links between the devices 20 and the infrastructure 200 are implemented will depend inter alia on how the devices 20 and the infrastructure 200 are implemented. The infrastructure 200 includes one or more data processing entity 210 (e.g. servers) to provide a given service to the devices 20. In some non-limiting implementations, the infrastructure 200 is a datacenter.

In use, each device 20 may transmit, over the communication network 50, a connection request 22 to the infrastructure 200 to establish a communication session therewith. The ensemble of the connection requests for the infrastructure 200 may be referred to as a "traffic" for that service provide 200. However, in some instances, one or more malicious devices 20 may transmit malicious connection requests 22' that are part of a DoS attack. For example, a given malicious device 20 or a group of malicious devices 20 may transmit a substantially high number of concurrent connection requests to make the infrastructure 200, a given data processing entity 210 thereof or a group of data processing entities 210, unavailable to other devices 20 by temporarily or indefinitely disrupting services of the infrastructure 200.

In the context of the present disclosure, a given data processing entity 210 or a group of data processing entities 210, physical and/or virtual, to which a device 20 desires to establish a communication session with is referred to as a "destination device" for that device 20. For example, a data processing entity 210 may be hardware equipment (e.g. a server) or a service (e.g. a website or a database) provided by hardware equipment.

In order to mitigate attacks on the infrastructure 200, the communication environment 1000 includes a detection service 100 communicably connected to the infrastructure 200. An implementation of the detection service 100 is described in greater details herein after (see FIG. 6). For example and without limitation, the detection service 100 may be operated by one or more servers. In alternative non-limiting implementations of the present technology, the functionality of the detection service 100 may be distributed and may be implemented via multiple servers.

Even though the detection service 100 is depicted separately from the service provider, functions of the detection service 100 described herein may be performed by the infrastructure 200.

As will be described in greater details herein below, the detection service 100 may execute an authentication protocol pipeline that may leverage different computational resources at different stages of the authentication protocol pipeline, and may effectively prevent DoS attacks and recognize them before they can cause considerable damages to the service provider and/or legitimate devices 20. The detection service 100 receives the connection requests 22 before a communication session is established between the devices 20 that transmitted connection requests 22 and the infrastructure 200. The detection service 100 may thus prevent a communication session to be established in response to a malicious network event being identified. As it will be described in greater details herein after, the detection service 100 may execute a mitigation execution module 164 (see FIG. 2) in response to a DoS attack being detected.

Figure 2:
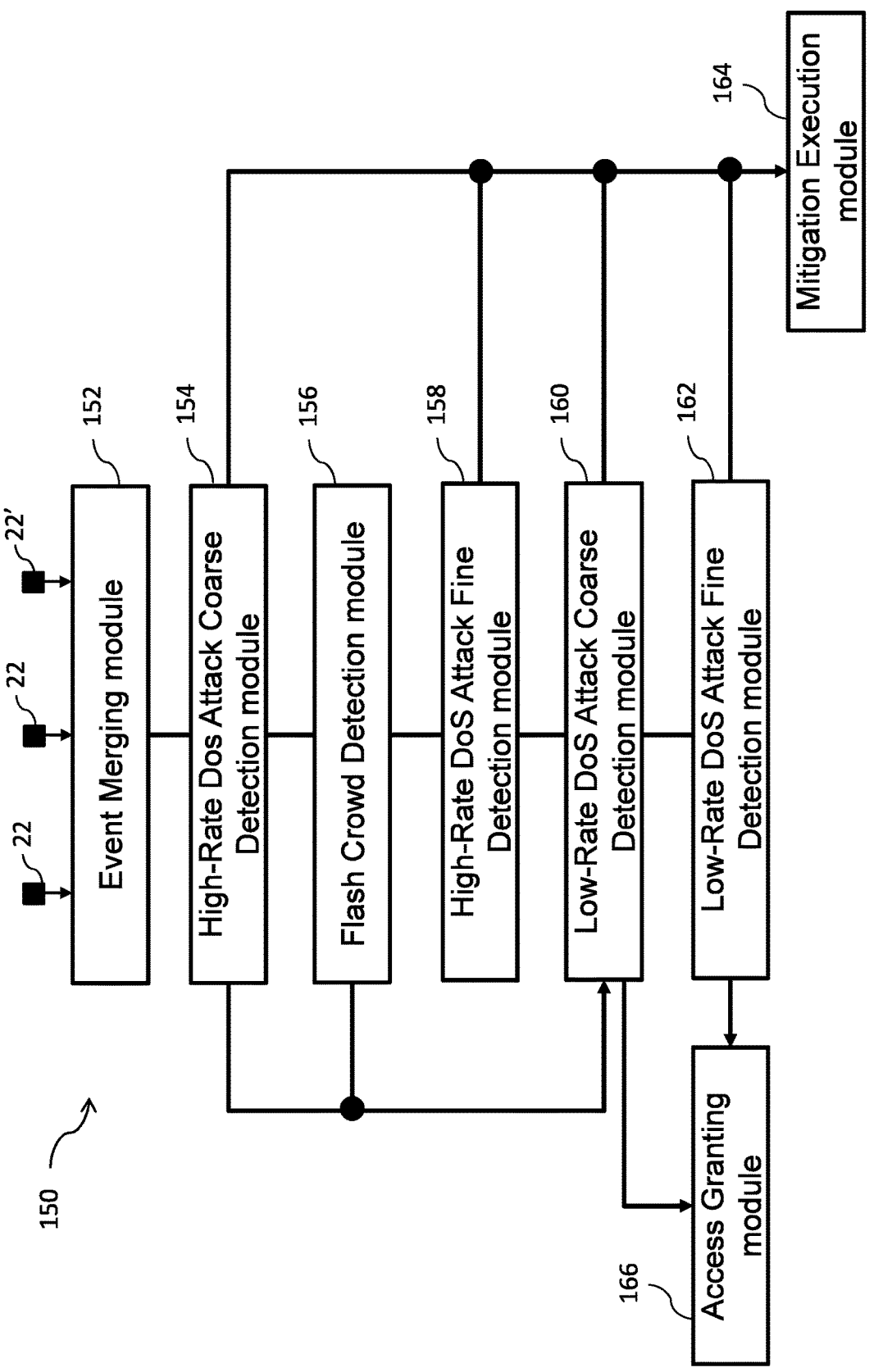
FIG. 2 is a block diagram of an authentication protocol pipeline executed by a detection device of the communication environment of FIG. 1 in accordance with some non-limiting implementations of the present technology.

FIG. 2 is a block diagram of an authentication protocol pipeline 150 that may be executed by the detection service 100 in response to receiving a new connection request 22. In this implementation, each connection request 22 transmitted by a given device 20 desiring to establish a communication session with a target device includes a communication dataset including:

information about a source IP address of the given device 20;

information about a source port of the given device 20;

information about a destination IP address of a corresponding destination device;

information about a destination port of the corresponding destination device; and information about a protocol used for communication between the given device 20 and the corresponding destination device.

Figure 4A:
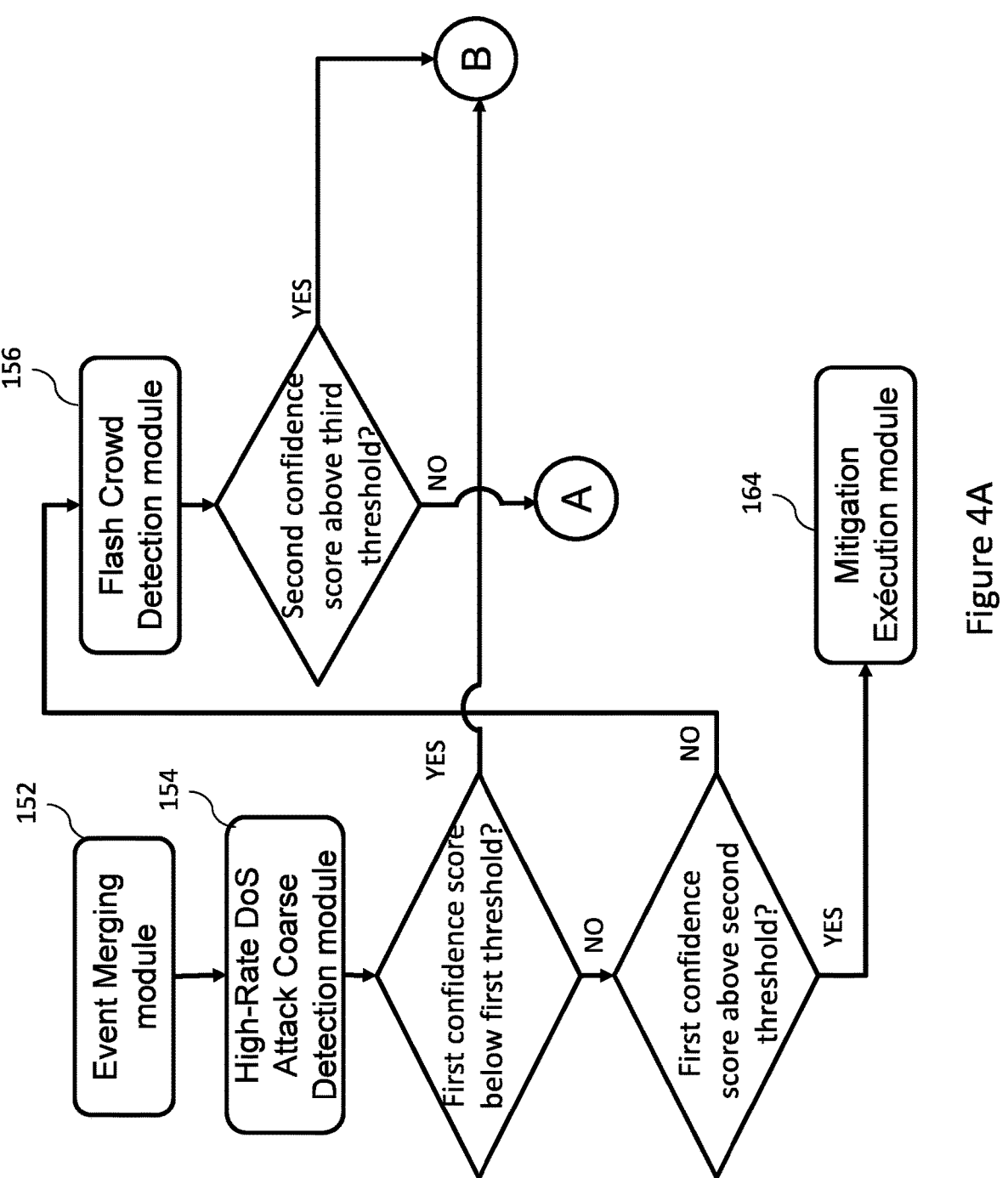
FIGS. 4A and 4B are a high-level flowchart representing operations of an execution of the authentication protocol pipeline of FIG. 2 in accordance with some non-limiting implementations of the present technology.
Figure 4B:
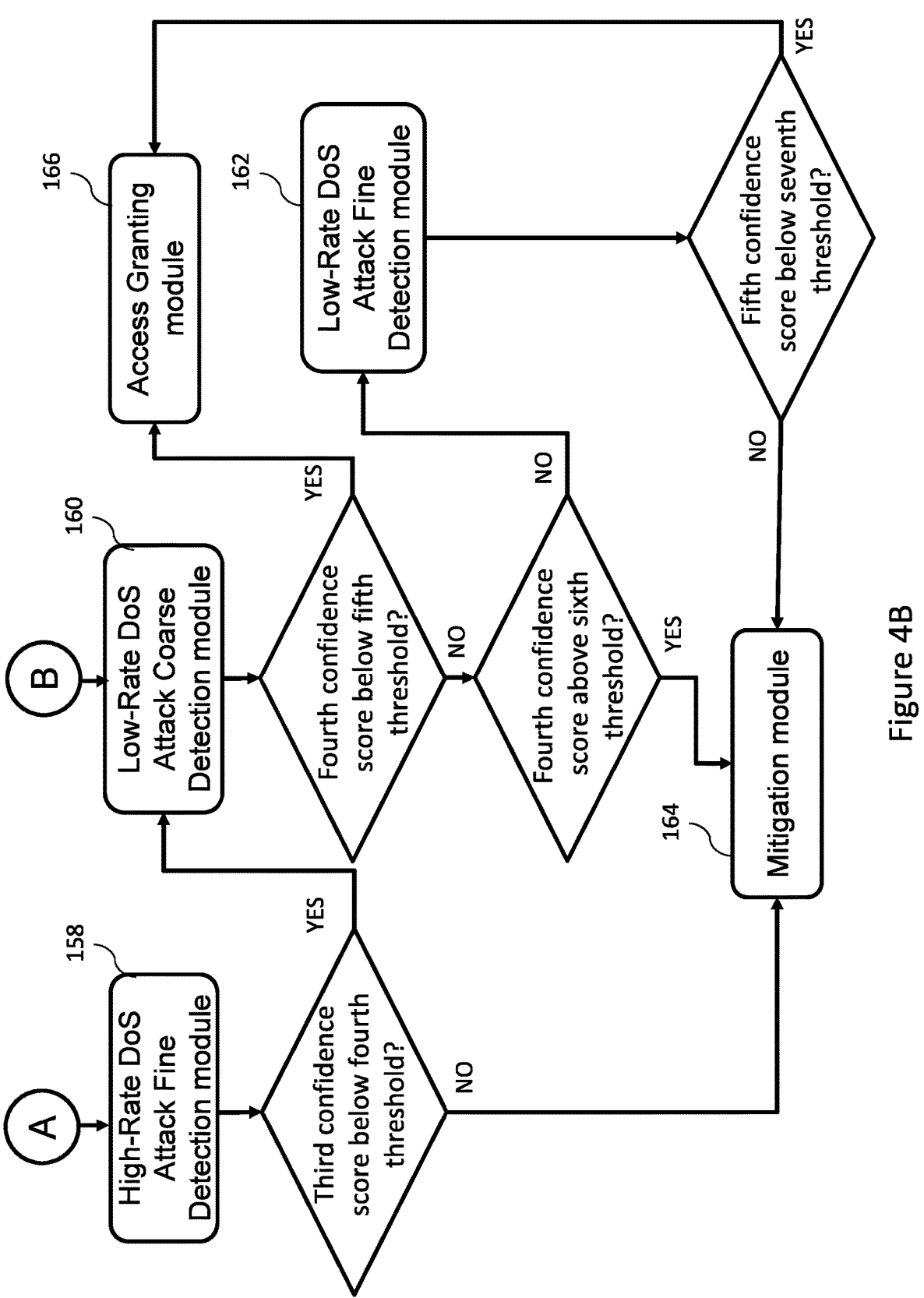

Execution of the authentication protocol pipeline 150 will now be described with reference to FIGS. 2, 4A and 4B. It should be noted that the authentication protocol pipeline 150 is a modular pipeline, and that some modules thereof may be executed in different orders and/or omitted in alternative implementations.

Event Merging Module

The authentication protocol pipeline 150 includes an event merging module 152 that receives the connection request 22, or "network events", and extract the above information therefrom. The event merging module 152 may cluster connection requests based on the source IP address, the destination IP address, the destination port and/or the destination port of each of the connection requests 22. For example, connection requests 22 having a first destination IP address are clustered by the event merging module 152 as a first connection cluster, and connection requests 22 having a second destination IP address are clustered by the event merging module 152 as a second connection cluster. Sub-clusters may also be identified by the event merging module 152. For example, connection requests 22 having the first destination IP address and a first source IP address are identified by the event merging module 152 as a first sub-cluster of the first connection cluster, and connection requests 22 having the first destination IP address and a second source IP address are identified by the event merging module 152 as a second sub-cluster of the first connection cluster.

Broadly speaking, the event merging module 152 may deserialize network events and merge them into a given data format used by the detection service 100 for statistical analysis thereof. This module handles different input formats as they can vary depending on the type of equipment from which the connection requests are received. For example, the network events may have a NetFlow data format, a sFlow data format or a kFlow data format.

In some implementation, the event merging module 152 converts a data format of the received connection requests into a same given data format. This may further case a clustering of the connection requests. For example, a first connection request received at the event merging module 152 may have a NetFlow data format, and a second connection request received at the event merging module 152 may have a sFlow data format. The event merging module 152 may converts the data formats of the first and second connection requests into the kFlow data format (or any other data format) prior determining whether or not the first and second connection requests belong to a same connection cluster.

The event merging module 152 may further forward information about the connection clusters to a high-rate DoS attack coarse detection module 154. In some non-limiting implementations, the event merging module 152 forwards information about the connection clusters to a high-rate DoS attack coarse detection module 154 only for the groups that include at least a pre-determined number of connection requests 22.

High-Rate DoS Attack Coarse Detection Module

In this implementation, the high-rate DoS attack coarse detection module 154 executes a high-rate DoS attack coarse detection algorithm that determines, for each connection cluster, a first confidence score based on the communication datasets extracted from the connection requests 22 of the connection cluster. The first confidence score is indicative of a first probability that the connection cluster is associated with a high-rate DoS attack. The high-rate DoS attack coarse detection algorithm may include statistical tests to determine the first confidence score, as described in "A New Detection Method for Distributed Denial-of-Service Attack Traffic based on Statistical Test", by Chin-Ling Chen and published in January 2009 by *The Journal of Universal Computer Science*. Alternatively, the high-rate DoS attack coarse detection algorithm may be implemented as described in "Real-time DoS attack detection using FPGA", by N. Hoquea, H. Kashyapb and D. K. Bhattacharyya, and published in September 2017 in *Computer Communications*, the entirety of which is incorporated by reference for jurisdictions allowing such incorporation. Yet alternatively, the high-rate DoS attack coarse detection algorithm may be implemented as described in "Detecting Distributed Denial of Service Attacks by Sharing Distributed Beliefs" by Tao Peng, Christopher Leckie and Kotagiri Ramamohanarao, and published as a conference paper in January 2003, the entirety of which is also incorporated by reference for jurisdictions allowing such incorporation.

Broadly speaking, in some implementations, DoS detection algorithms described in the present disclosure may implement threshold algorithms in which a threshold value, or set of threshold values, is used to distinguish ranges of values in which what is predicted by the model varies significantly. In use, a threshold algorithm may define a threshold value for acceptable traffic and detect a DoS attack when this threshold value is exceeded. Threshold algorithms are relatively easy to implement and inexpensive in resources, but can lead to false alarms or fail to detect low rate attacks.

In addition or alternatively, the DoS detection algorithms described in the present disclosure may implement packet distribution analysing algorithms. The DoS detection algorithms parse through the statistical distribution of packets of the traffic (e.g., connection requests) to detect anomalies in the traffic data. DoS detection algorithms may be suitable for detection of low rate attacks, but may require a large amount of data for reliable statistical analysis. DoS detection algorithms may also be affected by background noise.

In addition or alternatively, the DoS detection algorithms described in the present disclosure may implement behavior analysing algorithms that learn normal traffic patterns to detect anomalies and abnormal behavior. The behavior analysing algorithms may detect low-rate attacks with high accuracy, but at the expense of a large amount of training data which therefore and can therefore be resource intensive to implement.

In addition or alternatively, the DoS detection algorithms described in the present disclosure may implement sequence analysing algorithms that parse through packet sequences to detect anomalies such as repeated sequences of similar packets. The algorithms are effective in detecting low rate attacks, but may require a significant amount of memory to store the packet sequences.

In addition or alternatively, the DoS detection algorithms described in the present disclosure may implement Machine Learning Algorithms (MLA) such as deep learning algorithms, clustering algorithms, neural networks, logistic regression algorithms, decision trees, principal component analysis, and/or Support Vector Machine (SVM)-based algorithms. More specifically, neural networks are deep learning algorithms that can be used to detect DoS attacks by learning from network traffic data. Neural networks can be used to detect anomalies in network traffic and distinguish legitimate from malicious traffic. Decision tree-based algorithms are classification algorithms that can be used to detect DoS attacks by classifying network traffic into different categories. Decision tree-based algorithms may be trained on network traffic data to identify the characteristics of DoS attacks and use them to detect future attacks. SVM-based algorithms are classification algorithms that can also be used to detect DDoS attacks. SVMs can be trained on network traffic data to find decision boundaries that distinguish legitimate from malicious traffic. These illustrative implementations of machine learning algorithms may detect complex attacks that cannot be detected by signature-based methods.

The MLAs may have been trained to detect anomalies in the traffic data using historical data. They can detect low and high-rate attacks with high accuracy, but require a significant amount of training data and can be resource intensive to implement. These algorithms can be used independently or in combination for more accurate detection of low and high-rate DoS attacks. In addition, higher-performance DoS detection algorithms require more resources to implement, but can also provide more accurate and reliable detection of DoS attacks.

Summarily, the DoS detection algorithms described in the present disclosure may implement, one or more of the following algorithms, alone or in collaboration: threshold algorithms, packet distribution analysing algorithms, behavior analysing algorithms, sequence analysing algorithms and MLAs.

In response to the first confidence score being below a first threshold (i.e. the first probability being indicative that the connection cluster does not constitute a high-rate DoS attack), the connection cluster is not considered as a high-rate DoS attack by the high-rate DoS attack coarse detection module 154, and the detection service 100 and may execute a low-rate DoS attack coarse detection module 160 that is described in greater details herein after. In an implementation, the first threshold is 15%.

In the context of the present disclosure, thresholds associated with confidence scores of DoS algorithms may be defined based on a plurality of parameters including:

Data Distribution parameter: the threshold for anomaly detection may be at least partly based on a statistical distribution of traffic data;

Detection Objective parameter: the threshold for anomaly detection may be at least partly based on a desired alert rate and/or a tolerable false positive rate;

Traffic history parameter: the threshold for anomaly detection may be at least partly based on a traffic history used to determine normal and abnormal traffic variations;

Desired accuracy: the threshold for anomaly detection may be at least partly based on a desired balance between accuracy and false positives; and/or Type of attack: the threshold for anomaly detection may be at least partly based on a type of attack, as some attacks may be more difficult to detect than others.

Broadly speaking, in the context of the present disclosure, for a given data processing entity 210 adapted for receiving, at most, a maximum traffic data rate (e.g. a maximum number of connection requests per second that can be handled), a high-rate DoS attack has a rate of more than about one percent of the maximum traffic data rate, and a low-rate DoS attack (e.g. a Economic Denial of Sustainability (EDoS) attack) has a rate of less than about one percent of the maximum traffic data rate. For a given service (e.g. a client of the infrastructure 200 providing a service hosted by the data processing entities 210), a DoS attack is considered to be a high-rate DoS attack when it constitutes more than 50% of the traffic for The service, while it is considered to be a low-rate DoS attack when it constitutes less than 50% of the traffic for The service.

In response to the first confidence score being above a second threshold (i.e. the first probability being indicative that the connection cluster constitutes a high-rate DoS attack), the connection cluster is considered as a high-rate DoS attack by the high-rate DoS attack coarse detection module 154. The detection service 100 thus executes a mitigation execution module 164. Execution of the mitigation execution module 164 may include generation of a mitigation order and/or transmission of information about the connection cluster to an anti-DoS attack dedicated system (not shown). The anti-DoS attack dedicated system may perform additional analysis on the connection clusters received from modules of the authentication protocol pipeline 150. For example, the anti-DoS attack dedicated system may implement mitigation measures consisting of filtering illegitimate connection requests while letting legitimate connection requests access the infrastructure 200. The anti-DoS attack dedicated system may be implemented as described in the European Patent Application No. 3618355, titled "SYSTEMS AND METHODS FOR OPERATING A NETWORKING DEVICE" and filed on Aug. 27, 2018, the entirety of which is also incorporated by reference herein. In an implementation, the second threshold is 85%.

In response to the first confidence score being above the first threshold and below the second threshold, the detection service 100 executes a flash-crowd detection module 156 adapted to detect flash-crowd events. In the context of the present disclosure, a flash-crowd event occurs when a substantially high number of legitimate connection requests 22 are received to establish communication sessions with the same destination device. Broadly speaking, a flash-crowd event happens when the destination device is unable to handle the volume of legitimate connection requests. In opposition to malicious connection requests, connection requests that form a flash-crowd event are legitimate.

Broadly speaking, the high-rate DoS attack coarse detection module 154 identifies high-rate DoS attacks and uses limited computational resources and processing resource allocation such as, for example and without limitation, power processing resource allocation and/or memory allocation, to separate possibly suspicious traffic from legitimate traffic. In some implementations, the high-rate DoS attack coarse detection module 154 may use known heuristics. In use, the high-rate DoS attack coarse detection module 154 may detect egress and ingress DoS attacks as well as outgoing DoS attacks. If the confidence of the high-rate DoS attack coarse detection module 154 is above a predefined threshold, a mitigation event is directly issued. Otherwise, the detection service 100 proceeds with the execution of the authentication protocol pipeline 150.

Flash-Crowd Detection Module

The flash-crowd detection module 156 may execute a flash-crowd detection algorithm to establish whether the connection cluster is associated with a flash-crowd event. The flash-crowd detection algorithm may be implemented as described in "Detection of spoofed and non-spoofed DoS attacks and discriminating them from flash crowds", by Jaideep Gera and Bhanu Prakash Battula, and published in July 2018 in *EURASIP Journal on Information Security*. Alternatively, the flash-crowd detection algorithm may be implemented as described in "Modeling Human Behavior for Defense Against Flash-Crowd Attacks", by G. Oikonomou and J. Mirkovic, and published in June 2009 in 2009 *IEEE International Conference on Communications*, the entirety of which is also incorporated by reference for jurisdictions allowing such incorporation. Yet alternatively, the flash-crowd detection algorithm may be implemented as described in "Flash Crowd Detection Using Decoy Hyperlinks", by Dimitris Gavrilis, Ioannis Chatzis and Evangelos Dermatas, and published in April 2007 in 2007 *IEEE International Conference on Networking, Sensing and Control*, the entirety of which is incorporated by reference herein.

In this implementation, the flash-crowd detection algorithm determines, for each connection cluster received from the high-rate DoS attack coarse detection module 154, a second confidence score based on the communication dataset extracted from the connection requests 22 of the connection cluster. The second confidence score is indicative of an estimation of the flash-crowd detection module 156 about whether the connection cluster is associated with a flash-crowd event.

In response to the second confidence score being below a third threshold, the connection cluster is not considered as a flash-crowd event by the flash-crowd detection module 156, and the detection service 100 executes a high-rate DoS attack fine detection module 158 that is described in greater details herein after. In response to the second confidence score being above the third threshold, the connection cluster is considered as being associated with a flash-crowd event by the detection service 100. The detection service 100 thus executes the low-rate DoS attack coarse detection module 160. In an implementation, the third threshold is 50%.

Broadly speaking, the flash-crowd detection module 156 indicates whether the suspected traffic is associated with a flash-crowd event or not. If a flash crowd is not detected, the connection requests continue to be analyzed by the detection service 100. Otherwise, the connection requests are considered legitimate. In some implementations, in response to the connection requests being deemed legitimate by the flash-crowd detection module 156 (i.e. occurrence of a flash-crowd event), the detection service 100 issues a message to the infrastructure 200 indicating that the suspicious traffic is a flash crowd event.

High-Rate DoS Attack Fine Detection Module

In this implementation, the high-rate DoS attack fine detection module 158 executes a high-rate DoS attack fine detection algorithm that generates a second confidence score indicative of a second probability that the connection cluster is associated with a DoS attack. More specifically, in some implementations, the high-rate DoS attack fine detection algorithm determines, for each connection cluster received from the flash-crowd detection module 154, a third confidence score based on the communication dataset extracted from the connection requests 22 of the connection cluster. The third confidence score is indicative of an estimation of the high-rate DoS attack fine detection module 158 about whether or not the connection cluster constitutes a high-rate DoS attack. The high-rate DoS attack fine detection algorithm may be implemented as described in "DoS Detection Method Based on Chaos Analysis of Network Traffic Entropy", by Xinlei Ma and Yonghong Chen and published in December 2013 in *IEEE Communications Letters*, the entirety of which is incorporated by reference herein. Alternatively, the high-rate DoS attack fine detection algorithm may be implemented as described in "DoS Attack Detection Using Fast Entropy Approach on Flow-Based Network Traffic", by Jisa David and Ciza Thomas, and published in May 2015 in *Procedia Computer Science*, the entirety of which is also incorporated by reference herein.

Broadly speaking, the high-rate DoS attack fine detection module 158 differs from the high-rate DoS attack coarse detection module 154 in the following aspects. In an implementation, connection clusters used by the high-rate DoS attack coarse detection module 154 are based on first communication datasets extracted from connection requests received at the network during a first collection time having a first time span. Upon being transmitted to the high-rate DoS attack fine detection module 158, the connection clusters are adjusted by extracting second communication datasets from connection requests received at the network during a second collection time having a second time span longer than the first time span. Therefore, the high-rate DoS attack fine detection module 158 may be more accurate in detecting attacks, but may be slower to provide a response to an attack.

In some implementations, adjusting a given connection cluster may include identifying pairs of device 20/destination device based on the communication datasets, and/or collecting additional information from the traffic data about the pairs.

Indeed, the connection cluster, after having been adjusted with additional information, may include more recognizable pattern, provide more data usable by the high-rate DoS attack fine detection module 158 compared to the input of the high-rate DoS attack coarse detection module 154. It can be said that the high-rate DoS attack coarse detection module 154 acts as a filter for the high-rate DoS attack fine detection module 158. In use, the high-rate DoS attack coarse detection module 154 may handle Terabytes of connection requests, while the high-rate DoS attack fine detection module 158 may handle Gigabytes of connection requests. The high-rate DoS attack fine detection module 158 is thus less likely to analyse a relative high amount of connection cluster and connection requests. It can thus use more time and provide more detailed analysis compared to the high-rate DoS attack coarse detection module 154.

In some implementations, an implementation complexity of the high-rate DoS attack fine detection module 158 may be greater than that of the high-rate DoS attack coarse detection module 154. For example, the execution of the high-rate DoS attack coarse detection module 154 may be constrained, for a given connection cluster, within a first processing resource allocation. In this example, the execution of the high-rate DoS attack fine detection module 158 may be constrained, for the given connection cluster adjusted during the second collection time, within a second processing resource allocation being greater than the first processing resource allocation.

In use, the high-rate DoS attack fine detection module 158 may require a significant amount of computing resources, such as memory, storage, and processing power, while the high-rate DoS attack coarse detection module 154 may require fewer resources.

Broadly speaking, an increase of the collecting time for the connection clusters used as inputs of the high-rate DoS attack coarse detection module 154 and the high-rate DoS attack fine detection module 158 may result in the following aspects. With a longer collection time, the high-rate DoS attack fine detection module 158 may analyze a larger amount of traffic data for improved attack detection. For example, by collecting data (i.e. a number of connection requests) over a longer period of time, the high-rate DoS attack fine detection module 158 may refine analyses of normal traffic patterns and thus provide a more accurate detection of anomalies indicative of a DoS attack.

In response to the third confidence score being below a fourth threshold, the connection cluster is not considered as a high-rate DoS attack by the high-rate DoS attack fine detection module 158, and the detection service 100 may execute the low-rate DoS attack coarse detection module 160. In an implementation, the fourth threshold is 50%. In response to the third confidence score being above the fourth threshold, the connection cluster is considered as a high-rate DoS attack by the detection service 100. The detection service 100 thus executes the mitigation execution module 164.

It should be note that the execution of the high-rate DoS attack coarse detection algorithm executed by the high-rate DoS attack coarse detection module 154 is constrained, for a given connection cluster, within a first processing resource allocation. The execution of the high-rate DoS attack fine detection algorithm executed by the high-rate DoS attack fine detection module 158 is constrained, for the given connection cluster, within a second processing resource allocation that is greater than the first processing resource allocation. In other words, the high-rate DoS attack fine detection module 158 may provide more accurate identification of malicious connection attempts. In use, the authentication protocol pipeline 150 causes execution of the high-rate DoS attack fine detection module 158, and involves associated relatively great processing resource allocation, in response to the high-rate DoS attack coarse detection module 154 being uncertain about an occurrence of a DoS attack. This may provide efficient and accurate detection of the DoS attacks with low computational latency.

Broadly speaking, the high-rate DoS attack fine detection module 158 is executed in response to the confidence in the decisions of the previous modules (i.e. the high-rate DoS attack coarse detection module 154 and the flash-crowd detection module 156) being below associated thresholds. In some implementations, since a smaller part of the traffic is analyzed at the high-rate DoS attack fine detection module 158, developers of the present technology have devised more resource-intensive calculations to be executed by the high-rate DoS attack fine detection module 158 in comparison to the high-rate DoS attack coarse detection module 154. This may increase an accuracy of the decision of the DoS attack detection.

In the context of the present disclosure, distinction between high-rate and low-rate attacks may be relied upon to increase an efficiency of the detection of the attack. For example, in the case of a high-rate attack, it is easier to identify the attack using methods such as Wilson's Continuity Corrected Score method. In case a low-rate attack, the identification of the attack includes discriminating malicious traffic from legitimate since the two are statistically very close. Here, statistical pattern identification methods can be used. Broadly speaking, it can be said that high-rate DoS attacks are volumetric attacks aimed at saturating a communication link, while low rate DoS attacks such as "Slow-loris" attacks send attack packets to a target device at a sufficiently low-rate to try to elude detection. Low rate DoS attacks may imitate a behavior of legitimate users to exploit a flaw by requiring connection requests to a server or a device without ever establishing said connections, solely to consume computing resources of the server or device.

Figure 3:
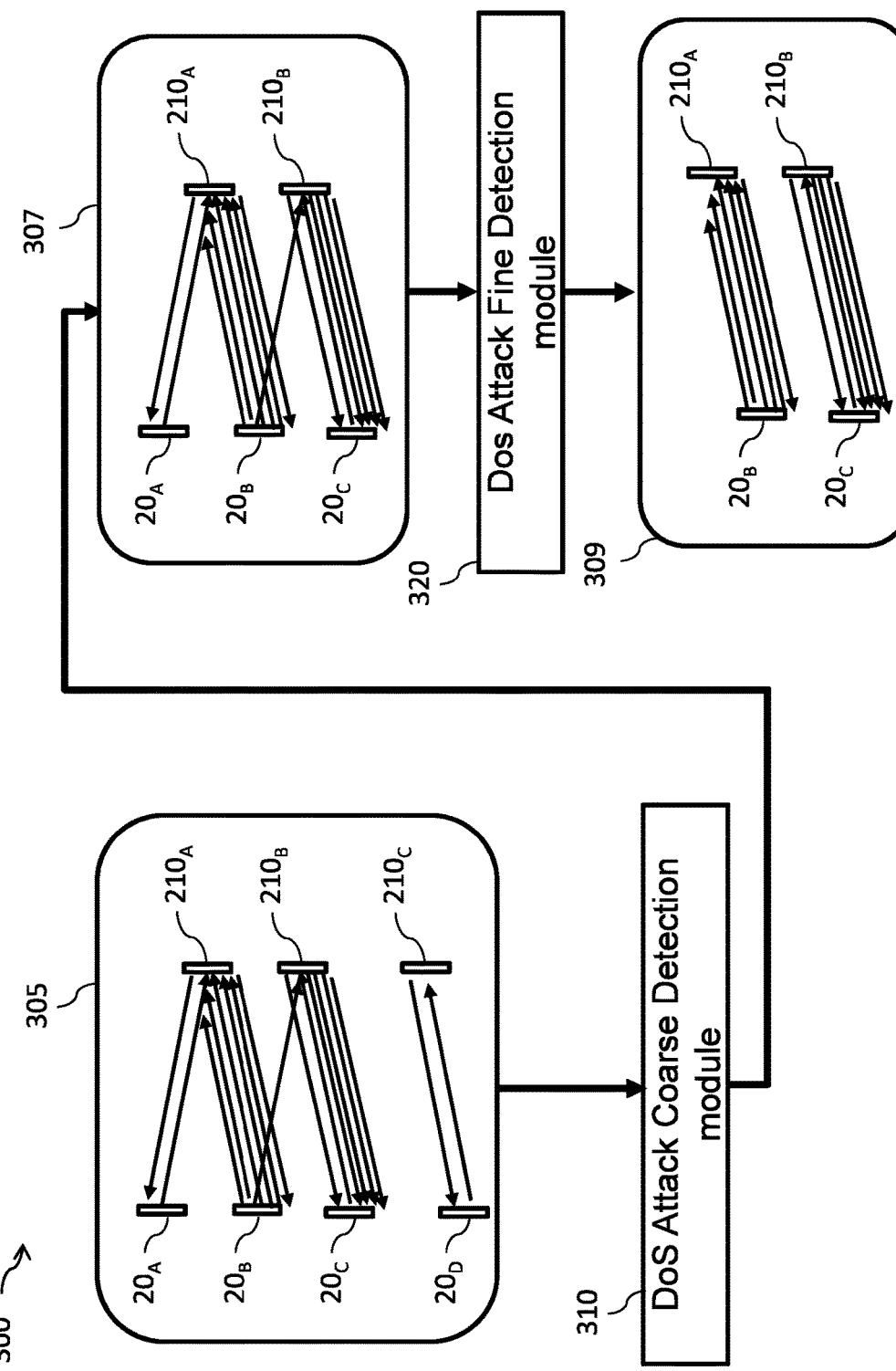
FIG. 3 illustrates a DoS detection pipeline for detecting DoS attacks in accordance with some non-limiting implementations of the present technology.

FIG. 3 illustrates a DoS pipeline 300 for detecting DoS attacks in accordance with some non-limiting implementations of the present technology. The pipeline 300 includes a DoS attack coarse detection module 310 and a DoS attack fine detection module 320. The DoS attack coarse detection module 310 and the DoS attack fine detection module 320 may be for example and without limitation, the high-rate DoS attack coarse detection module 154 and the high-rate DoS attack fine detection module 158 respectively, or the low-rate DoS attack coarse detection module 160 and the low-rate DoS attack fine detection module 162 respectively that are described in greater details hereinafter.

In an implementation, the DoS attack coarse detection module 310 receives communication datasets 305 about communication requests between devices 20A, 20B and 20*c*, and data processing entities 210A and 210B. Arrows in the representation of the communication datasets 305 in FIG. 3 are representative of communication requests and form connection clusters. It can be seen that the device 20B transmits a relatively high number of communication requests to the data processing entity 210A and that the data processing entity 210*g* transmits a relatively high number of communication requests to the device 20*c*.

In use, identification of DoS attacks by the DoS attack coarse detection module 310 is made per source IP address and per destination IP address. More specifically, the DoS attack coarse detection module 310 may identify communication requests of the traffic that involves a same source IP address. For a given source IP address, the DoS attack coarse detection module 310 further executes detection algorithms as disclosed herein to flag DoS attacks. In addition, for a given destination IP address, the DoS attack coarse detection module 310 further executes detection algorithms as disclosed herein to flag DoS attacks. It can be said that the DoS attack coarse detection module 310 aggregates connection requests per IP address (source or destination) to form the connection clusters that are further analyzed. In this implementation, the DoS attack coarse detection module 310 determines a first confidence score indicative of a first probability that a connection cluster is associated with a DoS attack. The DoS attack coarse detection module 310 may further compare the first confidence score with a first threshold, to determine whether a mitigation order is to be generated. Thresholds used by the DoS attack coarse detection module 310 to flag IP addresses may be pre-determined to reduce computation time of said identification.

Otherwise, the DoS attack coarse detection module 310 may transmit the corresponding source IP addresses and the corresponding destination IP addresses to the DoS attack fine detection module 320. In other words, the DoS attack coarse detection module 310 transmit indication of the IP addresses for which there is uncertainties about whether or not the connection requests thereto and/or therefrom are illegitimate. In some implementations, the DoS attack coarse detection module 310 may remove connection requests from the pipeline 300 in response to the confidence score being below a second threshold (i.e. the DoS attack coarse detection module 310 is confident that these connection requests are not part of a DoS attack).

Said transmission of connection clusters from the DoS attack coarse detection module 310 to the DoS attack fine detection module 320 is depicted as adjusted communication datasets 307 in FIG. 3. In this implementation, information about the devices 20 and the data processing entities 210, as well as other devices 20 and other data processing entities 210 communication therewith, involved in a communication with an IP address flagged by the DoS attack coarse detection module 310 are included in the adjusted communication datasets 307.

It can be said that an execution of the DoS attack coarse detection module 310 is a "broad detection phase" of the detection pipeline 300. For example and without limitation, the DoS attack coarse detection module 310 may receive information about between approximately 4 and 5 millions of communication requests per second.

The DoS attack fine detection module 320 further executes detection algorithm for IP addresses flagged by the DoS attack coarse detection module 310 included in the adjusted communication datasets 307. More specifically, for each IP address, the DoS attack fine detection module 320 parses through (i) the devices 20 and/or the data processing entities from which the communication requests are received, (ii) an amount of data that is exchanged therewith, (iii) the devices 20 and/or the data processing entities to which communication requests are sent and (iv) an amount of data that is exchanged therewith. As such, the DoS attack fine detection module 320 relies on pairs of IP addresses (source and destination) to identify DoS attacks.

For example and without limitation, the DoS attack fine detection module 320 may receive information about between approximately 400,000 and 500,000 communication requests per second. It should also be noted that the collection time for collecting information about the IP addresses flagged by the DoS attack coarse detection module 310 is increased upon execution of the DoS attack fine detection module 320. Indeed, given that the DoS attack fine detection module 320 has less communication requests to analyze, the collection time thereof may be increased and still provide computing times suitable to detect DoS attacks and protect the infrastructure 200 therefrom. It can be said that the connection clusters are adjusted by extracting second communication datasets from connection requests received at the network during the second collection time having a second time span longer than a first time span of the first collection time.

In this implementation, the DoS attack fine detection module 320 determines a second confidence score indicative of a second probability that a connection cluster is associated with a DoS attack. In response to the second confidence score being higher than a threshold, a mitigation order may be executed. Otherwise, the connection cluster is consider as legitimate by the DoS attack fine detection module 320. In the same or other implementations, the thresholds used by the DoS attack fine detection module 320 to flag IP addresses may be determined based on dynamic heuristics such as a current bandwidth of a flagged data processing entity, a current flow rate of the traffic received at the infrastructure 200, a reputation score of the data processing entity assigned by an operator of the infrastructure 200 and/or other dynamic heuristic to increase accuracy of the DoS attack fine detection module 320.

Broadly speaking, the DoS attack coarse detection module 310 flags IP addresses using data gathered during a first collection time, while the DoS attack fine detection module 320 flags pairs of IP addresses among the ones flagged by the DoS attack coarse detection module 310 and using data gathered during a second collection time that is greater than the first collection time. Usage of computing resources is thus substantially reduced (e.g. ten times less).

It can thus be said that the DoS attack coarse detection module 310 acts as a filter for the DoS attack fine detection module 320 by eliminating connection cluster that are most likely (i.e. relative high confidence score) to be a DoS attack and causing execution of a mitigation order in response. The DoS attack fine detection module 320 thus analyses with greater computing resources, and thus an increased accuracy, the connection clusters for which the DoS attack coarse detection module 310 was unable to make a decision about whether or not a mitigation order should be executed. The "two-stage" structure of the detection pipeline 300 may thus reduce requirement in terms of computing resources, costs and latency for detecting DoS attacks compared to known detection pipelines.

As described herein, one of the distinctions between DoS attack detection algorithms (equally referred to as "DoS attack "coarse" detection algorithms") and DoS attack "fine" detection algorithms includes adjustment of the collection time. On the other hand, a larger number of samples is used for executing the DoS attack "fine" detection algorithms which increase the collection time and provide significantly less false positives that coarse detection algorithm.

Low-Rate DoS Attack Coarse Detection Module

In this implementation, the low-rate DoS attack coarse detection module 160 executes a low-rate DoS attack coarse detection algorithm that determines, for each connection cluster received from the high-rate DoS attack coarse detection module 154, the flash-crowd detection module 154 or the high-rate DoS attack fine detection module 158, a fourth confidence score based on the communication dataset extracted from the connection request 22 of The connection cluster.

The fourth confidence score is indicative of a third probability that the connection cluster is associated with a DoS attack. The low-rate DoS attack coarse detection algorithm may be implemented as described in "An empirical evaluation of information metrics for low-rate and high-rate DoS attack detection", by Monowar H. Bhuyan, D. K. Bhattacharyya and J. K. Kalita and published in January 2015 in Pattern Recognition Letters, the entirety of which is incorporated by reference for jurisdictions allowing such incorporation. Alternatively, the low-rate DoS attack coarse detection algorithm may be implemented as described in "Detection of the botnets' low-rate DoS attacks based on self-similarity", by Sergii Lysenko, Kira Bobrovnikova, Serhii Matiukh, Ivan Hurman and Olch Savenko, and published in August 2020 in International Journal of Electrical and Computer Engineering, the entirety of which is also incorporated by reference for jurisdictions allowing such incorporation.

In response to the fourth confidence score being below a fifth threshold, the connection cluster is not considered as a low-rate DoS attack by the low-rate DoS attack coarse detection algorithm, and the detection service 100 and may execute an access granting module 166 for generating a network access granting order, granting an establishment of the communication sessions and/or causing execution of additional authentication algorithms. In an implementation, the fifth threshold is 15%.

In response to the fourth confidence score being above a sixth threshold, the connection cluster is considered as a low-rate DoS attack by the low-rate DoS attack coarse detection algorithm. The detection service 100 thus executes the mitigation execution module 164. In an implementation, the sixth threshold is 85%.

In response to the first confidence score being above the fifth threshold and below the sixth threshold, the detection service 100 executes a low-rate fine detection module 162.

Broadly speaking, typical heuristics on which the low-rate fine detection module 162 is based cannot make decisions when there is a substantially high amount of traffic to analyze. As such, according to an implementation of the authentication protocol pipeline 150, the low-rate fine detection module 162 is executed when no high-rate attacks have been found or considered legitimate by the previous modules of the authentication protocol pipeline 150.

Low-Rate DoS Attack Fine Detection Module

In this implementation, the low-rate fine detection module 162 executes a low-rate fine detection algorithm that determines, for each connection cluster received from the low-rate DoS attack coarse detection module 160, a fifth confidence score based on the communication dataset extracted from the connection request 22 of the connection cluster. The fifth confidence score is indicative of indicative of a fourth probability that the connection cluster is associated with a DoS attack.

Broadly speaking, the fifth confidence score is indicative an estimation of the low-rate fine detection module 162 about whether or not the connection cluster is associated with a low-rate DoS attack. The low-rate fine detection algorithm may be implemented as described in "DoS Detection Method Based on Chaos Analysis of Network Traffic Entropy", by Xinlei Ma and Yonghong Chen and published in December 2013 in *IEEE Communications Letters*, the entirety of which is also incorporated by reference for jurisdictions allowing such incorporation. Alternatively, the low-rate fine detection algorithm may be implemented as described in "An empirical evaluation of information metrics for low-rate and high-rate DoS attack detection", by Monowar H. Bhuyana, D. K. Bhattacharyya and J. K. Kalita, and published in January 2015 in Pattern Recognition Letters, the entirety of which is also incorporated by reference for jurisdictions allowing such incorporation.

In response to the fifth confidence score being below a seventh threshold, the connection cluster is not considered as a low-rate DoS attack by the low-rate fine detection algorithm, and the detection service 100 may execute the access granting module 166. In an implementation, the seventh threshold is 50%. In response to the fifth confidence score being above the seventh threshold, the connection cluster is considered as a low-rate DoS attack by the low-rate DoS fine detection module 162. The detection service 100 thus executes the mitigation execution module 164. It can be said that the low-rate fine detection module 162 is executed when the confidence scores relative to the decisions of the previous modules of the authentication protocol pipeline 150 are below associated thresholds.

Broadly speaking, the low-rate DoS attack fine detection module 162 differs from the low-rate DoS attack coarse detection module 160 in the following aspects. In an implementation, connection clusters used by the low-rate DoS attack coarse detection module 160 are based on first communication datasets extracted from connection requests received at the network during a first collection time having a first time span. The first collection time may be the same collection time than the collection time of the high-rate DoS attack coarse detection module 154, or a different one with another time span. In some implementations, the collection time of the low-rate DoS attack coarse detection module 160 may have a higher time span than that of the high-rate DoS attack coarse detection module 154 to provide an improved detection of low-rate DoS attacks.

Upon being transmitted to the low-rate DoS fine detection module 162, the connection clusters are adjusted by extracting second communication datasets from connection requests received at the network during a second collection time having a second time span longer than the first time span. Therefore, the low-rate DoS fine detection module 162 may be more accurate in detecting attacks, but may be slower to provide a response to an attack.

Indeed, the connection cluster, after having been adjusted with additional information, may include more recognizable pattern, provide more data usable by the low-rate DoS fine detection module 162 compared to the input of the low-rate DoS attack coarse detection module 160. It can be said that the low-rate DoS attack coarse detection module 160 acts as a filter for the low-rate DoS fine detection module 162. In use, the low-rate DoS attack coarse detection module 160 may handle Terabytes of connection requests, while the low-rate DoS attack fine detection module 162 may handle Gigabytes of connection requests. The low-rate DoS fine detection module 162 is thus less likely to analyse a relative high amount of connection cluster and connection requests.

It can thus use more time and provide more detailed analysis compared to the low-rate DoS attack coarse detection module 160.

In some implementations, an implementation complexity of the low-rate DoS fine detection module 162 may be greater than that of the low-rate DoS attack coarse detection module 160. For example, the execution of the low-rate DoS attack coarse detection module 160 may be constrained, for a given connection cluster, within a first processing resource allocation. In this example, the execution of the low-rate DoS fine detection module 162 may be constrained, for the given connection cluster adjusted during the second collection time, within a second processing resource allocation being greater than the first processing resource allocation.

In use, the low-rate DoS fine detection module 162 may require a significant amount of computing resources, such as memory, storage, and processing power, while the low-rate DoS attack coarse detection module 160 may require fewer resources.

Broadly speaking, an increase of the collecting time for the connection clusters used as inputs of the low-rate DoS attack coarse detection module 160 and the low-rate DoS fine detection module 162 may result in the following aspects. With a longer collection time, the low-rate DoS fine detection module 162 may analyze a larger amount of traffic data for improved attack detection. For example, by collecting data (i.e. a number of connection requests) over a longer period of time, the low-rate DoS fine detection module 162 may refine analyses of normal traffic patterns and thus provide a more accurate detection of anomalies indicative of a DoS attack. In addition, by increasing the collection time, the low-rate DoS fine detection module 162 may better detect low-rate attacks, which may be difficult to detect using a relatively short collecting time.

Summarily, the detection service 100 may, by executing the authentication protocol pipeline 150, detect low-rate and high-rate attacks with high confidence, differentiate between flash-crowd events and malicious attacks, and adapt an amount of running computational resources to determine occurrence of an attack to reduce computational latency. As can be seen, the authentication protocol pipeline 150 is a modular pipeline including a plurality of modules that may be changed in order and/or enriched from other algorithms.

FIG. 5 is a flow diagram of a method 400 for detecting Denial of Service (DoS) attacks on a network, such as the communication network 50, according to some implementations of the present technology. In one or more aspects, the method 400 or one or more steps thereof may be performed by a processor or a computer system, such as the detection service 100. The method 400 or one or more steps thereof may be embodied in computer-executable instructions that are stored in a computer-readable medium, such as a non-transitory mass storage device, load-ed into memory and executed by a CPU. Some steps or portions of steps in the flow diagram may be omitted or changed in order.

The method 400 starts with extracting, at operation 410, communication datasets from connection requests received at the network. Each communication dataset comprising a corresponding connection request and an indication of a corresponding destination device.

For example and without limitations, the communication dataset of a given connection request may include information about a source IP address of a corresponding device, information about a source port of the corresponding device, information about a destination IP address of a corresponding destination device, information about a destination port of the corresponding destination device and information about a protocol used for communication between the corresponding device and the corresponding destination device.

In some implementations, a data format of a given connection request may be a NetFlow data format, a SFlow data format or a kFlow data format.

The method 400 continues with clustering, at operation 420, connection requests based on the communication datasets to form a plurality of connection clusters. For example, the connection requests may be clustered by identifying a corresponding destination device for each of the connection request and partitioning the connection requests into connection clusters based on their corresponding destination device. The connection requests associated to a same destination device may thus be grouped in a same connection cluster.

The method 400 continues with executing, at operation 430 and for at least one connection cluster, a first DoS attack detection algorithm (e.g. the high-rate DoS attack coarse detection module 154), to generate, based on the communication datasets corresponding to the given connection cluster, a first confidence score indicative of a first probability that the connection cluster is associated with a DoS attack. In some implementations, the execution of the first DoS attack detection algorithm is constrained, for the given connection cluster, within a first processing resource allocation.

The method 400 continues with comparing, at operation 440, the first confidence score with a first threshold, to determine whether a mitigation order is to be generated In some implementations, an execution of the mitigation order causes activation of an anti-DoS attack dedicated system adapted for execution of mitigation measures.

In some implementations, comparing the first confidence score with a first threshold, to determine whether a mitigation order is to be generated includes comparing the first confidence score with a first threshold, to determine whether (i) a mitigation order is to be generated or (ii) a flash-crowd detection algorithm is to be executed, the flash-crowd detection algorithm being configured to establish whether the connection cluster is associated with a flash-crowd event.

The method 400 continues with adjusting, at operation 450, the connection cluster by extracting second communication datasets from connection requests received at the network during a second collection time having a second time span longer than the first time span. In some implantations, the first collection time is included in the first collection time. For example, the second time span may be twice the first time span. A ratio of the first time span over the second time span is not limitative.

The method 400 continues with executing, at operation 460, a second DoS attack detection algorithm (e.g. the high-rate DoS attack fine detection module 158) to generate, based on the communication datasets corresponding to the given adjusted connection cluster, a second confidence score indicative of a second probability that the adjusted connection cluster is associated with a DoS attack. In some implementations, the execution of the second DoS attack detection algorithm is constrained, for the given connection cluster, within a second processing resource allocation being greater than the first processing resource allocation.

In some implementations, the second DoS attack detection algorithm is executed in response to no flash-crowd being detected.

In use, the connection cluster, after having been adjusted with additional information during the second time span, may include more recognizable pattern, provide more data usable by the second DoS attack detection module compared to the input of the first DoS attack detection module. It can be said that the first DoS attack detection module acts as a filter for the second DoS attack detection module. The second DoS attack detection module is thus less likely to analyse a relative high amount of connection cluster and connection requests. It can thus use more time and provide more detailed analysis compared to the first DoS attack detection module.

In some implementations, the second DoS attack detection algorithm may adjust a number of connection requests comprised in the connection cluster by collecting additional connection requests received at the network.

In some implementations, the method 400 further includes comparing the second confidence score with a second threshold to determine whether (i) a mitigation order is to be generated or (ii) a third DoS attack detection algorithm (e.g. the low-rate DoS attack coarse detection module 160) is to be executed. In use, the third DoS attack detection algorithm generates, based on the communication datasets corresponding to the given connection cluster collected during a third collecting time, a third confidence score indicative of a third probability that the connection cluster is associated with a DoS attack. The third collecting time may correspond to the first collecting time or a different collecting time. The third collecting time may be, for example and without limitations, based on the first and/or second confidence scores. The execution of the third DoS attack detection algorithm is constrained, for the given connection cluster, within a third processing resource allocation.

The method 400 may further include, in response to no DoS attack being detected by the third DoS attack detection algorithm, adjusting the connection cluster by extracting fourth communication datasets from connection requests received at the network during a fourth collection time having a fourth time span longer than the third time span. In some implantations, the third collection time is included in the fourth collection time. For example, the fourth time span may be twice the third time span. A ratio of the third time span over the fourth time span is not limitative.

The method 400 continues with executing, at operation 460, a fourth DoS attack detection algorithm (e.g. the low-rate DoS attack fine detection module 162) to generate, based on the communication datasets corresponding to the given connection cluster during a fourth collecting time, a fourth confidence score indicative of a fourth probability that the connection cluster is associated with a DoS attack. The execution of the fourth DoS attack detection algorithm is constrained, for the given connection cluster, within a fourth processing resource allocation being greater than the third processing resource allocation.

In use, the connection cluster, after having been adjusted with additional information during the fourth time span, may include more recognizable pattern, provide more data usable by the fourth DoS attack detection module compared to the input of the third DoS attack detection module. It can be said that the third DoS attack detection module acts as a filter for the fourth DoS attack detection module. The fourth DoS attack detection module is thus less likely to analyse a relative high amount of connection cluster and connection requests. It can thus use more time and provide more detailed analysis compared to the third DoS attack detection module.

In some implementations, the method 400 further includes comparing the fourth confidence score with a third threshold to determine whether (i) a mitigation order is to be generated or (ii) a network access granting order is to be generated. In the same or other implementations, the low-rate DoS fine detection algorithm includes a Machine Learning Algorithm.

In some implementations, the method 400 further includes comparing the third confidence score with a fourth threshold to determine whether a network access granting order is to be generated.

In the same or other implementations, the third DoS attack detection algorithm is executed directly after the execution of the first DoS attack detection algorithm. More specifically, the method 400 may include comparing the first confidence score with a fifth threshold to determine whether the third DoS attack detection algorithm is to be executed subsequently to the execution of the first DoS attack detection algorithm.

The method 400 may further include, in response to a flash-crowd event being detected by the flash-crowd detection algorithm, executing the third DoS attack detection algorithm.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It will be appreciated that at least some of the operations of the method 400 may also be performed by computer programs, which may exist in a variety of forms, both active and inactive. Such as, the computer programs may exist as software program(s) comprised of program instructions in source code, object code, executable code or other formats. Any of the above may be embodied on a computer readable medium, which include storage devices and signals, in compressed or uncompressed form. Representative computer readable storage devices include conventional computer system RAM (random access memory), ROM (read only memory), EPROM (erasable, programmable ROM), EEPROM (electrically erasable, programmable ROM), and magnetic or optical disks or tapes. Representative computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general.

Figure 6:
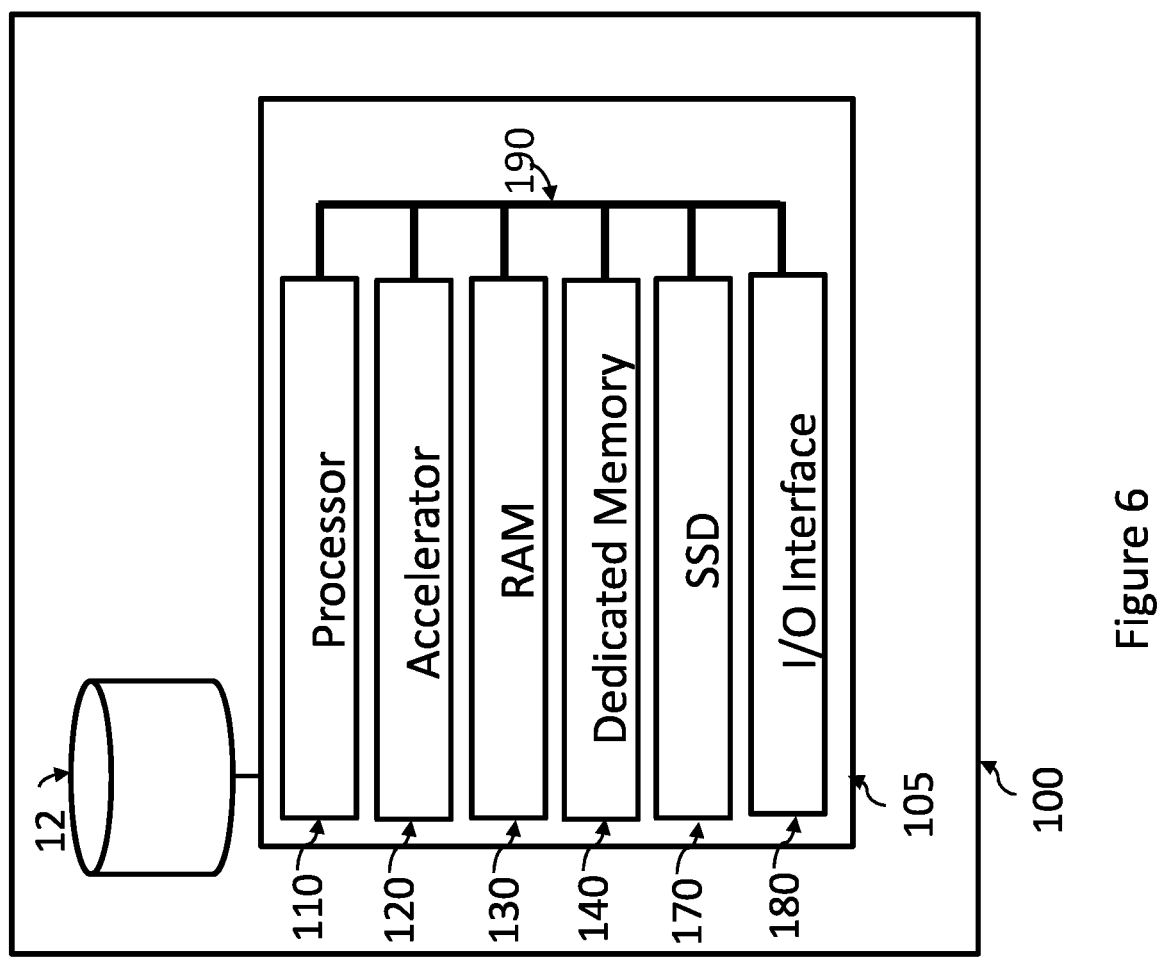
FIG. 6 is a block diagram of the detection device of the communication environment of FIG. 1 in accordance with some non-limiting implementations of the present technology.

FIG. 6 is a schematic representation of the detection service 100 in accordance with some non-limiting implementations of the present technology. The detection service 100 may include additional components in alternative embodiments. Some components may be omitted in alternative embodiments. The detection service 100 includes a computing unit 105 that may receive the traffic to be analyzed and execute the authentication protocol pipeline 150. In some implementations, the computing unit 105 may be implemented by any of a conventional personal computer, a controller, and/or an electronic device (e.g., a server, a controller unit, a control device, a monitoring device etc.) and/or any combination thereof appropriate to the relevant task at hand. In some embodiments, the computing unit 105 comprises various hardware components including one or more single or multi-core processors collectively represented by a processor 110, a solid-state drive 170, a random access memory (RAM) 130, a dedicated memory 140 and an input/output interface 180. The computing unit 105 may be a computer specifically designed to analyse traffic to one or more infrastructure such as the infrastructure 200 and detection malicious attacks. The computing unit 105 may be a generic computer system.

In some other embodiments, the computing unit 105 may be an "off the shelf" generic computer system. In some embodiments, the computing unit 105 may also be distributed amongst multiple systems. The computing unit 105 may also be specifically dedicated to the implementation of the present technology. As a person in the art of the present technology may appreciate, multiple variations as to how the computing unit 105 is implemented may be envisioned without departing from the scope of the present technology.

Communication between the various components of the computing unit 105 may be enabled by one or more internal and/or external buses 190 (e.g. a PCI bus, universal serial bus, IEEE 1394 "Firewire" bus, SCSI bus, Serial-ATA bus, ARINC bus, etc.), to which the various hardware components are electronically coupled.

The input/output interface 180 may provide networking capabilities such as wired or wireless access. As an example, the input/output interface 180 may comprise a networking interface such as, but not limited to, one or more network ports, one or more network sockets, one or more network interface controllers and the like. In use, the input/output interface 180 may be used by the detection service 100 to receive and transmit data through the communication network 50. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 170 stores program instructions suitable for being loaded into the RAM 130 and executed by the processor 110. Although illustrated as a solid-state drive 170, any type of memory may be used in place of the solid-state drive 170, such as a hard disk, optical disk, and/or removable storage media. According to implementations of the present technology, the solid-state drive 170 stores program instructions suitable for being loaded into the RAM 130 and executed by the processor 110 for executing generation of 3D representation of objects. For example, the program instructions may be part of a library or an application.

The processor 110 may be a general-purpose processor, such as a central processing unit (CPU) or a processor dedicated to a specific purpose, such as digital signal processor (DSP) for traffic analysis. In some implementations, the processor 110 may also rely on an accelerator 120 dedicated to certain given tasks, such as executing the methods set forth in the paragraphs below. In some implementations, the processor 110 or the accelerator 120 may be implemented as one or more field programmable gate arrays (FPGAs). Moreover, explicit use of the term "processor", should not be construed to refer exclusively to hardware capable of executing software, and may implicitly include, without limitation, application specific integrated circuit (ASIC), read-only memory (ROM) for storing software, RAM, and non-volatile storage. Other hardware, conventional and/or custom, may also be included.

The device 10 may comprise a memory 12 communicatively connected to the computing unit 105 and configured to store, for example and without limitation, values of the first, second, third, fourth, sixth and seventh thresholds. The memory 12 may be embedded in the device 10 as in the illustrated embodiment of FIG. 6 or located in an external physical location. The computing unit 105 may be configured to access a content of the memory 12 via a network (not shown) such as a Local Area Network (LAN) and/or a wireless connection such as a Wireless Local Area Network (WLAN).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented method for detecting a Denial-of-Service (DoS) attack on a network, the method comprising:

extracting first communication datasets from connection requests received at the network during a first collection time having a first time span, each first communication dataset comprising a connection request and an indication of a corresponding destination device;

clustering the connection requests based on the communication datasets to form a plurality of connection clusters;

for at least one of the connection clusters:

executing a first DoS attack detection algorithm, to generate, based on the communication datasets corresponding to the given connection cluster, a first confidence score indicative of a first probability that the given connection cluster is associated with a DoS attack;

comparing the first confidence score with a first threshold, to determine whether a mitigation order is to be generated;

adjusting the given connection cluster by extracting second communication datasets from connection requests received at the network during a second collection time having a second time span longer than the first time span;

executing a second DoS attack detection algorithm to generate, based on the communication datasets corresponding to the given connection cluster, a second confidence score indicative of a second probability that the given connection cluster is associated with a DoS attack; and comparing the second confidence score with a second threshold to determine whether (i) a mitigation order is to be generated or (ii) a third DoS attack detection algorithm is to be executed, the third DoS attack detection algorithm being configured to generate, based on the communication datasets corresponding to the given connection cluster, a third confidence score indicative of a third probability that the given connection cluster is associated with a DoS attack.

2. The computer-implemented method of claim 1, wherein:

the communication dataset of a given connection request further comprises:

information about a source IP address of a corresponding device; and information about a destination IP address of a corresponding destination device, and the first DoS attack detection algorithm is a DoS attack coarse detection algorithm configured to aggregate connection requests per IP address to form the connection clusters.

3. The computer-implemented method of claim 2, wherein the second DoS attack detection algorithm is a DoS attack fine detection algorithm configured to aggregate connection requests per pair of source IP address/destination IP address to adjust the connection clusters.

4. The computer-implemented method of claim 1, wherein comparing the first confidence score with a first threshold, to determine whether a mitigation order is to be generated comprises:

comparing the first confidence score with a first threshold, to determine whether (i) a mitigation order is to be generated or (ii) a flash-crowd detection algorithm is to be executed, the flash-crowd detection algorithm being configured to establish whether the given connection cluster is associated with a flash-crowd event.

5. The computer-implemented method of claim 1, wherein:

the execution of the first DoS attack detection algorithm is constrained, for the given connection cluster, within a first processing resource allocation, and the execution of the second DoS attack detection algorithm is constrained, for the given connection cluster, within a second processing resource allocation being greater than the first processing resource allocation.

6. The computer-implemented method of claim 1, wherein, in response the third DoS attack detection algorithm being executed and to no DoS attack being detected by the third DoS attack detection algorithm, executing a fourth DoS attack detection algorithm to generate, based on the communication datasets corresponding to the given connection cluster, a fourth confidence score indicative of a fourth probability that the given connection cluster is associated with a DoS attack.

7. The computer-implemented method of claim 6, wherein:

the execution of the third DoS attack detection algorithm is constrained, for the given connection cluster, within a third processing resource allocation; and the execution of the fourth DoS attack detection algorithm is constrained, for the given connection cluster, within a fourth processing resource allocation being greater than the third processing resource allocation.

8. The computer-implemented method of claim 6, wherein:

the third DoS attack detection algorithm is configured to generate the third confidence score based on third communication datasets corresponding to the given connection cluster extracted during a third collection time having a third time span, the method further comprising, prior to executing the fourth DoS attack detection algorithm, adjusting the given connection cluster by extracting fourth communication datasets from connection requests received at the network during a fourth collection time having a fourth time span longer than the third time span.

9. The computer-implemented method of claim 6, further comprising comparing the fourth confidence score with a third threshold to determine whether (i) a mitigation order is to be generated or (ii) a network access granting order to the network is to be generated.

10. The computer-implemented method of claim 5, further comprising comparing the third confidence score with a fourth threshold to determine whether a network access granting order to the network is to be generated.

11. The computer-implemented method of claim 1, further comprising, comparing the first confidence score with a fifth threshold to determine whether the third Dos attack detection algorithm is to be executed subsequently to the execution of the first DoS attack detection algorithm.

12. The computer-implemented method of claim 1, wherein:

the first DoS attack detection algorithm is a high-rate DoS coarse detection algorithm, the second DoS attack detection algorithm is a high-rate DoS fine detection algorithm, the third DoS attack detection algorithm is a low-rate DoS coarse detection algorithm, and/or a fourth DoS attack detection algorithm is a low-rate DoS fine detection algorithm.

13. A system for detecting Denial-of-Service (DoS) attacks on a network, the system comprising a controller and a non-transitory memory storing a plurality of executable instructions which, when executed by the controller, cause the system to perform the method of claim 1.

14. A non-transitory computer-readable medium comprising computer-readable instructions that, upon being executed by a system, cause the system to perform the method of claim 1.

\*  \*  \*  \*  \*